United States Patent [19]

Yamaguchi

[11] Patent Number: 5,377,353
[45] Date of Patent: Dec. 27, 1994

[54] METHOD FOR MANAGING COMMON DATA STORED IN A MEMORY ACCESSIBLE BY A PLURALITY OF PROGRAMS

[75] Inventor: Shinichi Yamaguchi, Tokyo, Japan

[73] Assignee: NEC Corporation, Tokyo, Japan

[21] Appl. No.: 17,671

[22] Filed: Feb. 12, 1993

[30] Foreign Application Priority Data

Feb. 13, 1992 [JP] Japan ................... 4-26629

[51] Int. Cl.$^5$ .................... G06F 9/46; G06F 12/14
[52] U.S. Cl. ............... 395/650; 364/DIG. 1; 364/228.1; 364/231.6; 364/231.4
[58] Field of Search ............. 395/650; 364/DIG. 1, 364/228.1, 231.6, 231.4

[56] References Cited

U.S. PATENT DOCUMENTS 4,084,231  4/1978  Capozzi et al. ................ 364/200
4,823,261  4/1989  Bank et al. ..................... 364/200
5,247,684  9/1993  Tavares et al. ................. 395/700

Primary Examiner—Gareth D. Shaw
Assistant Examiner—A. Katbab
Attorney, Agent, or Firm—Sughrue, Mion, Zinn, Macpeak & Seas

[57] ABSTRACT

A system and method for managing common data including a computer on which at least one program runs, and a memory storing pairs of common data. Each of the pairs of common data corresponds to a common information item. When a program on the computer updates a common information item, it judges which one of the pair of common data is older, and updates the older common data by replacing the older one with new common data. When a program accesses a common information item, it judges which one of the pair of common data is newer, and accesses the newer one.

1 Claim, 4 Drawing Sheets

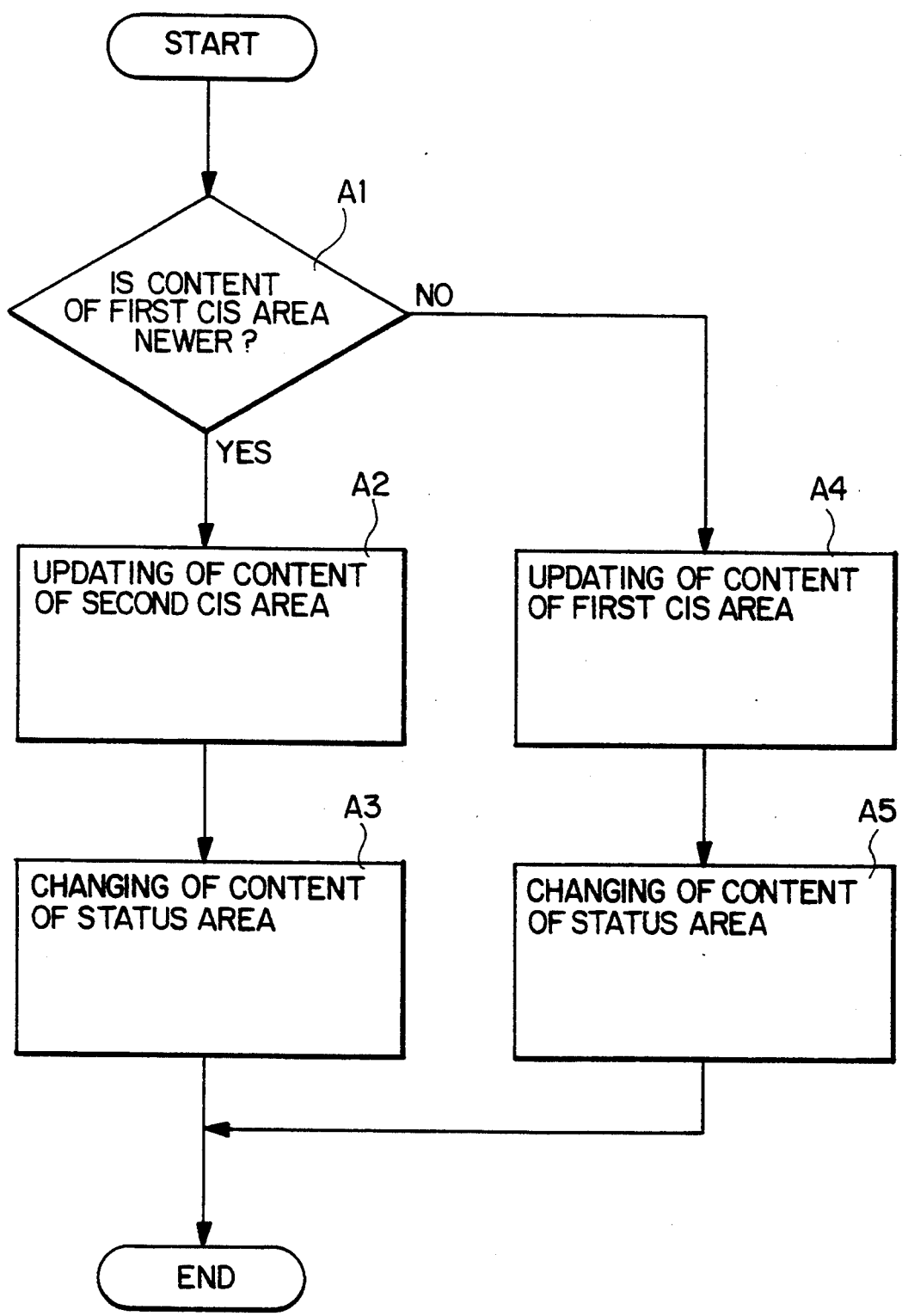

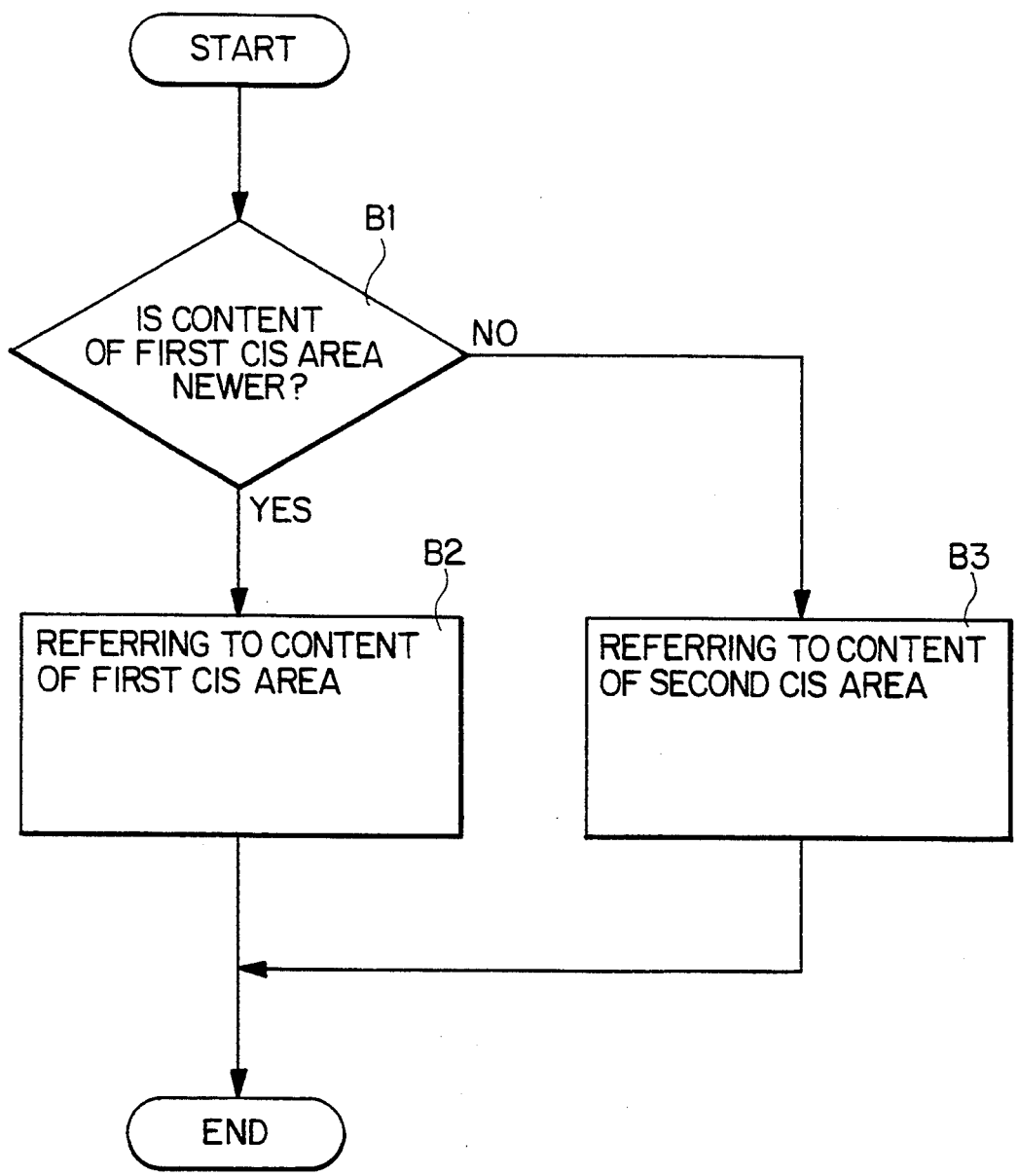

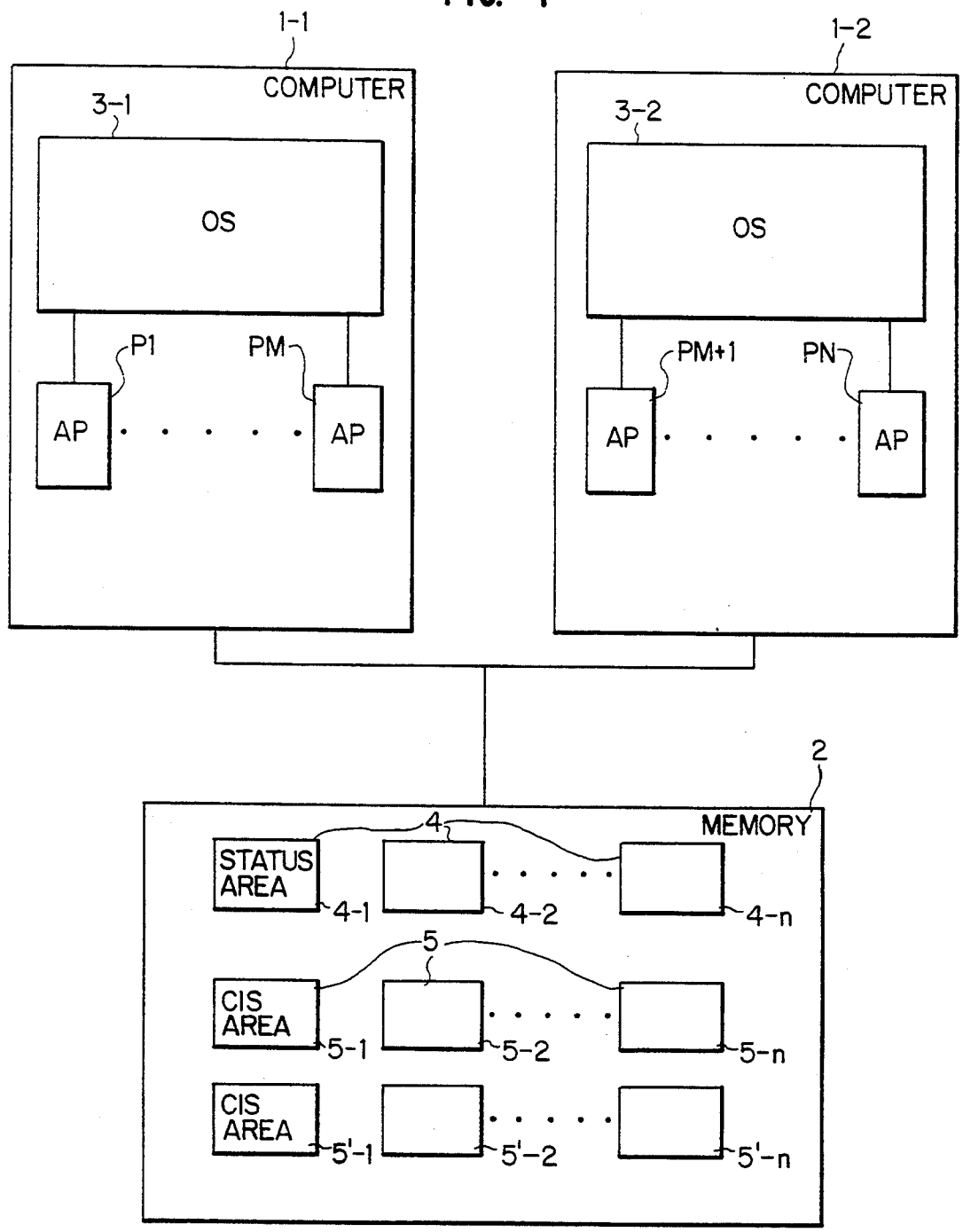

METHOD FOR MANAGING COMMON DATA STORED IN A MEMORY ACCESSIBLE BY A PLURALITY OF PROGRAMS

BACKGROUND OF THE INVENTION

The present invention relates to an apparatus and method for managing commonly used data which is referred to or accessed by a plurality of programs running on one or more computers.

Conventional computer systems are known, which can run a plurality of programs serially on a time-shared basis so as to look as if the plurality of programs are running simultaneously. In a conventional computer system, common information storage areas for storing common data are assigned in the memory space of the system and are accessible by each of the programs. However, the common data cannot always be accessed by the programs. For instance, while common data is being updated by a program having exclusive control in the system, the other programs are prohibited from accessing that common data while it is being updated. This is a problem because when a program has exclusive control, the processing efficiency of the computer system decreases as all other programs cannot access the common data while it is being updated, and, therefore, the program must wait until the updating process has completed.

SUMMARY OF THE INVENTION

Accordingly, it is an object of the invention to provide an apparatus and method for managing common data which is accessed by a plurality of programs and which is free from the above-mentioned problems and disadvantages.

The above and other objects of the present invention are accomplished by a system for managing common data including a computer for executing a first program and a second program, and a memory coupled to the computer and having a plurality of status areas, each corresponding to a common information item, and a plurality of first and second common data storage areas for storing common data for each of the common information item, each of the first and second common data storage areas collectively corresponding to one of the plurality of status areas, the status areas storing pointer data for indicating which one of the first and second common data storage areas stores new and old common data. The first program reads the contents of a status area corresponding to a particular common information item so as to determine which one of the first and second common data storage areas contains older common data, updating the one of the first and second common data storage areas determined to contain older common data with new common data, and changing the contents of the status area corresponding to the particular common information item to indicate that one of the first and second common data storage areas is storing the new common data which is more recent than the common data stored in the other of the first and second common data storage area. The second program reads the contents of the status area corresponding to a particular common information item to determine which one of the first and second common data storage areas is storing more recently updated common data.

In further accordance with the above and other objects, the present invention provides a system for managing common data including a first computer for executing a first program, a second computer for executing a second program, and a memory coupled to the computer and having a plurality of status areas, each corresponding to a common information item, and a plurality of first and second common data storage areas for storing common data for each of the common information item, each of the first and second common data storage areas collectively corresponding to one of the plurality of status areas, the status areas storing pointer data for indicating which one of the first and second common data storage areas stores new and old common data. The first program reads the contents of a status area corresponding to a particular common information item so as to determine which one of the first and second common data storage areas contains older common data, updating the one of the first and second common data storage areas determined to contain older common data with new common data, and changing the contents of the status area corresponding to the particular common information item to indicate that one of the first and second common data storage areas is storing the new common data which is more recent than the common data stored in the other of the first and second common data storage area. The second program reads the contents of the status area corresponding to a particular common information item to determine which one of the first and second common data storage areas is storing more recently updated common data.

Further, the present invention provides a method for managing common data stored in a memory so that at least first and second programs being executed on at least one computer can access the common data. The memory includes a plurality of status areas, each corresponding to a common information item, and a plurality of first and second common data storage areas for storing common data for each of the common information item, each of the plurality of the first and second common data areas collectively corresponding to one of the plurality of status areas. The method includes the steps of: (a) reading, by the first program, the contents of the status area corresponding to a particular one of the common information item to determine which one of the first and second common data storage areas contains older common data, updating the one of the first and second common data storage areas determined to contain older common data with new common data, and changing the contents of the status area corresponding to the particular common information item to indicate that one of the first and second common data storage areas is storing new common data which has been more recently updated than the common data stored in the other of the first and second common data storage areas, and (b) reading, by the second program, the contents of the status area corresponding to a particular common information item to determine which one of the first and second common data storage areas is storing newer common data, and accessing the one of the first and second common data storage areas determined to be storing newer common data.

Still, further, the present invention provides an apparatus for managing commonly used data including a computer for executing at least two application programs, and a memory comprising a plurality of status areas, each of which corresponds to a common information item, and a plurality of first and second command data storage areas for storing common data, each of the first and second common data storage areas collectively corresponding to one of the status areas, wherein the status areas stores first and second pointers, the first pointer pointing to one of the first and second common data storage areas which stores new common data, and the second pointer pointing to the other of the first and second common data storage areas which stores old data.

BRIEF DESCRIPTION OF THE DRAWINGS

Other features and advantages will become apparent from the following detailed description when taken in conjunction with the accompanying drawings, in which:

FIG. 2 is a flow chart illustrating the updating operation of a common data item;

FIG. 3 is a flow chart illustrating the reference operation of a common data item; and FIG. 4 is a block diagram of another preferred embodiment of the invention.

DETAILED DESCRIPTION OF THE PREFERRED EMBODIMENT

Figure 1:
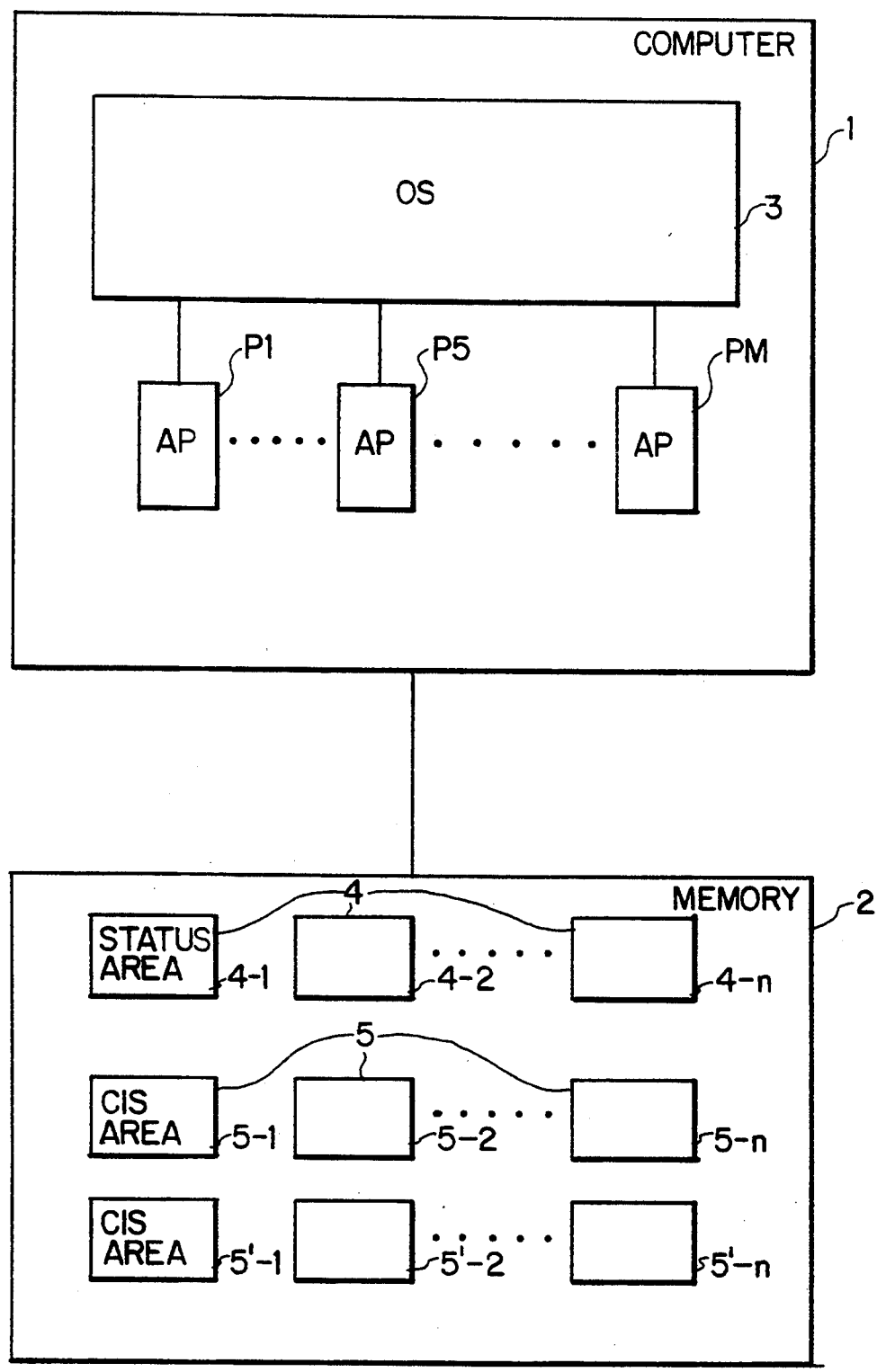
FIG. 1 is a block diagram of a preferred embodiment of the invention.

FIG. 1 shows an embodiment of the present invention, which includes a computer 1, a memory 2, an operating system (OS) 3, and a plurality of application programs P1 to PM. The OS 3, which is designed to schedule and supervise the execution of the programs P1 to PM, and the programs P1 to PM are implemented in software and executed on the computer 1 in a known manner. The memory 2 includes a plurality of status areas 4 and a plurality of first and second common information storage (CIS) areas 5. The plurality of status areas 4 and first and second CIS areas 5 are assigned to specific addresses in the memory 2.

Each of the status areas 4-n corresponds to a distinct common information item (e.g., time-of-day), and stores an old data pointer and a new data pointer. The old data pointer points to a location in one of the first and second CIS areas 5-n and 5'-n which stores old common data of a particular common information item, while the new data pointer points to a location in the other of the CIS areas 5-n and 5'-n, which stores new common data of the same particular information item. As will be described below in more detail, the old and new data pointers are constantly updated to point to old data and new data (i.e., data that has been more recently updated than the old data location), respectively.

The following describes the case where the program P5 accesses common data, which has just been updated by the program P1.

Referring to FIGS. 1 and 2, the program P1 updates a desired common information item by first retrieving the old data pointer from the status area 4-n corresponding to the desired common information item that is to be updated (step A1). The old data pointer of the area 4-n indicates which one of the first and second CIS areas 5-n and 5'-n contains common data that has been less recently updated. When the old data pointer of the area 4-n points to the second CIS area 5'-n, as an example, the program P1 updates the contents of the second CIS area 5'-n by writing new common data in the area 5'-n (step A2). Now that the second CIS area 5'-n contains new data, the program P1 updates the old data pointer and new data pointer of the area 4-n so that the new data pointer and old data pointer point to the area 5'-n and the area 5-n, respectively, (step A3).

After the program P1 updates the area 4-n (step A3), the program P5 can access the same common data by retrieving the new data pointer of the status area 4-n (step B1 in FIG. 3). Since, in this case, the new data pointer of the status area 4-n points to the CIS area 5'-n, the program P5 reads the data stored in the area 5'-n (step B3) to obtain the most recently updated data.

The following describes the situation where the program P5 accesses common data during the same period of time that the program P1 is updating the same common data.

In step A1, because the old data pointer of the area 4-n points to the first CIS area 5-n, the program P1 updates the contents of the first CIS area 5-n (step A4). However, if the time slot assigned to the program P1 elapses during the updating operation, the OS 3 discontinues the execution of the program P1 (even though the updating process has not completed) and allows another program to run, which, in this case is the program P5. The program P5 then reads the new data pointer stored in the status area 4-n which still points to the area 5'-n because the program P1 has not completed the updating process. As a result, the program P5 accesses the content of the area 5'-n (step B3).

Thereafter, when a next time slot is assigned to the program P1 by the OS 3, the program P1 resumes updating the content of the area 5-n (step A4). After the updating has been completed, the program P1 changes the old data pointer and new data pointer of the status area 4-1 so that the new data pointer and old data pointer point to the area 5-n and the area 5'-n, respectively (step A5).

Accordingly, the present invention provides a manner of allowing a second program, such as the program P5, to access common data, while it is being updated, without having to wait for the completion of the updating by another program, such as the program P1.

Although the above described embodiment only illustrates a single computer, it would be obvious to one skilled in the art that a plurality of computers could be employed in which a plurality of programs are executed and each of the programs accesses the same common data. That is, as shown in FIG. 4, while a first program PM, on a first computer 1-1 including a first operating system 3-1, is updating common data of a particular common information item stored in one of the CIS areas 5-1 and 5'-1, a second program PN on a second computer 1-2 with a second operating system 3-2 can access the same common data stored in the other CIS area corresponding to the same common information item.

What is claimed is:

1. A method for managing common data stored in a memory so that at least a plurality of programs being executed on at least one computer can access the common data of at least one common information item simultaneously, said memory including:

a single status area group including N (N=1,2,3...) status areas, each corresponding to one of said common information items, a common data storage group including N first common data storage areas for storing common data for each of said common information items, and N second common data storage areas for storing common data for each of said common information items, each of said N first and second common data areas corresponding to one of said status areas, said status areas each storing new and old pointers for indicating which one of said first and second common data storage areas corresponding to said each status area stores newer and older common data, respectively;

said method comprising the steps of:

when any of said plurality of programs updates the common data of one of said common information items, said any of said plurality of programs executes the following steps (a)-(c):

(a) reading the old pointer of the status area corresponding to said one of said common information items to determine which one of said first and second common data storage areas contains older common data;

(b) updating the one of said first and second common data storage areas determined to contain older common data with new common data; and (c) changing the new and old pointers of the status area corresponding to said one of said common information items to indicate which one of said first and second common data storage areas was updated with said new common data in step (b); and when any of said plurality of programs accesses the common data of any of said common information items, said any of said plurality of programs executes the following steps (d) and (e):

(d) reading the new pointer of said status area corresponding to said any of said common information items to determine which one of said first and second common data storage areas includes newer common data; and (e) accessing said one of said first and second common data storage areas determined in step (d) to include newer common data.

* * * * *